US012756572B2

(12) United States Patent
Im

(10) Patent No.: US 12,756,572 B2
(45) Date of Patent: Oct. 6, 2026

(54) IMAGE FORGERY PREVENTION DEVICE AND METHOD THEREOF USING HASH FUNCTION

(71) Applicant: AY Innovative Co. Ltd., Seoul (KR)

(72) Inventor: No Gan Im, Incheon (KR)

(73) Assignee: AY Innovative Co. Ltd., Seoul (KR)

( * ) Notice: Subject to any disclaimer, the term of this patent is extended or adjusted under 35 U.S.C. 154(b) by 70 days.

(21) Appl. No.: 18/922,406

(22) Filed: Oct. 22, 2024

(65) Prior Publication Data

US 2025/0141689 A1 May 1, 2025

(30) Foreign Application Priority Data

Oct. 26, 2023 (KR) ........................ 10-2023-0144945

(51) Int. Cl.
*H04L 9/32* (2006.01)
*G06F 21/16* (2013.01)
*G06F 21/62* (2013.01)

(52) U.S. Cl.
CPC ............ *H04L 9/3236* (2013.01); *G06F 21/16* (2013.01); *G06F 21/6254* (2013.01)

(58) Field of Classification Search
CPC ..... H04L 9/3236; H04L 9/0643; G06F 21/16; G06F 21/6254; G06F 21/6245; G06F 21/64; H04N 21/835; G06V 20/95; G06T 2210/12
See application file for complete search history.

(56) References Cited

U.S. PATENT DOCUMENTS

| | | | | |
|---|---|---|---|---|
| 10,044,501 | B1 * | 8/2018 | Bradley | H04L 63/0492 |
| 10,289,812 | B2 * | 5/2019 | Kim | G06Q 50/10 |
| 12,547,782 | B1 * | 2/2026 | Zhuk | G06F 21/84 |
| 12,585,816 | B2 * | 3/2026 | Fishkov | G06F 21/6245 |

FOREIGN PATENT DOCUMENTS

| | | | | |
|---|---|---|---|---|
| KR | 10-2012-0053451 A | | 5/2012 | |
| KR | 101639258 B1 | | 7/2016 | |
| KR | 101746167 B1 | | 6/2017 | |
| KR | 20200003971 A | * | 1/2020 | G06T 3/40 |

* cited by examiner

*Primary Examiner* — J. Brant Murphy
*Assistant Examiner* — Christopher Law
(74) *Attorney, Agent, or Firm* — ZION IP; Byungwoong Park

(57) ABSTRACT

An image forgery prevention device and a method thereof using a hash function are proposed, and the device includes a privacy area detection processor configured to detect a privacy area image from an original image, a hash value generation processor configured to use the hash function to generate a hash value of the privacy area image, an obfuscation processor configured to obfuscate the privacy area image, and a verification hash value insertion processor configured to insert a verification hash value corresponding to the hash value into an obfuscated privacy area of the original image in a predetermined encrypted form, so that the image forgery prevention device and the method thereof using the hash function of the present disclosure provides an efficient means for verifying whether a privacy area image is authentic or not by inserting verification hash value information in a metadata form or watermarking form into an obfuscated area of an original image.

6 Claims, 6 Drawing Sheets

IMAGE FORGERY PREVENTION DEVICE AND METHOD THEREOF USING HASH FUNCTION

CROSS REFERENCE TO RELATED APPLICATION

The present application claims priority to Korean Patent Application No. 10-2023-0144945, filed Oct. 26, 2023, the entire contents of which are incorporated herein for all purposes by this reference.

BACKGROUND

Field of the Invention

The present disclosure relates to the field of image forgery prevention and, more particularly, to an image forgery prevention device and a method thereof using a hash function.

Description of the Related Art

CCTVs, black boxes (i.e., dash cams), and the like record and store image footage, but exposure of an original image itself, such as a person's face or a vehicle license plate, raises concerns about privacy exposure.

Accordingly, in the case of CCTVs, after a person's face or a vehicle license plate is detected, a relevant part of an image thereof is blurred, mosaic-processed, or blind-processed and is saved and stored separately in order to protect the individual's privacy.

Sometimes, it may be required to restore the original image of the person's face or vehicle license plate as occasion demands. However, even when the image of the person's face or vehicle license plate is illegally replaced with another image, it is impossible to recognize whether the replaced image is authentic or not.

When an original image is replaced with an illegal substitute image, there may occur problems in that the uniqueness and integrity of image data are not ensured, and the illegally replaced and restored image may be used for malicious purposes.

Documents of Related Art (Patent Document 0001) Korean Patent Application Publication No. 10-2012-0053451 (published date: May 25, 2012)

SUMMARY

The present disclosure is for solving the above problems and an objective of the present disclosure is to provide an image forgery prevention device and a method thereof capable of verifying that an image of a blind-processed area is an authentic image restorable to the blind-processed area of an original image in order to ensure the uniqueness and integrity of the image.

The problems of the present disclosure are not limited to the above-mentioned problems, and other problems not described above will be clearly understood by those skilled in the art from the description of the claims.

According to an exemplary embodiment of the present disclosure, there is provided an image forgery prevention device using a hash function, the device including: a privacy area detection processor configured to detect a privacy area image from an original image; a hash value generation processor configured to use the hash function to generate a hash value of the privacy area image; an obfuscation processor configured to obfuscate the privacy area image; and a verification hash value insertion processor configured to insert a verification hash value corresponding to the hash value into an obfuscated privacy area of the original image in a predetermined encrypted form.

Preferably, the device may further include an authenticity determination processor configured to determine whether the privacy area image is authentic or not by comparing the hash value of the privacy area image with the verification hash value inserted into the obfuscated privacy area of the original image.

Preferably, the device may further include an image restoration processor configured to restore the privacy area image to the obfuscated privacy area in a case where the hash value and the verification hash value are identical.

Preferably, the detecting of the privacy area image may be performed by using artificial intelligence object detection technology, and the obfuscated privacy area may correspond to an area of a bounding box of the privacy area image.

Preferably, the predetermined encrypted form of the verification hash value inserted in the verification hash value insertion processor may be an encrypted-metadata form or a watermarking form.

According to another exemplary embodiment of the present disclosure, there is provided an image forgery prevention method using a hash function, the method including: a privacy area image detection step of detecting a privacy area image from an original image by a privacy area detection processor, a hash value generation step of using the hash function to generate a hash value of the privacy area image by a hash value generation processor; an obfuscation step of obfuscating the privacy area image by an obfuscation processor; and a verification hash value insertion step of inserting a verification hash value corresponding to the hash value into an obfuscated privacy area of the original image in a predetermined encrypted form by a verification hash value insertion processor.

Preferably, the method may further include an authenticity determination step of determining, by an authenticity determination processor, whether the privacy area image is authentic or not by comparing the hash value of the privacy area image with the verification hash value inserted into the obfuscated privacy area of the original image.

Preferably, the method may further include an image restoration step of restoring, by an image restoration processor, the privacy area image to the obfuscated privacy area in a case where the hash value and the verification hash value are identical.

Preferably, the detecting of the privacy area image may be performed by using artificial intelligence object detection technology, and the obfuscated privacy area may correspond to an area of a bounding box of the privacy area image.

Preferably, the predetermined encrypted form of the verification hash value inserted in the verification hash value insertion processor may be an encrypted-metadata form or a watermarking form.

The image forgery prevention device and the method thereof using the hash function of the present disclosure provide an efficient method for ensuring the data uniqueness and integrity of an original image when the original image including a privacy-related area is restored while strengthening privacy protection.

The image forgery prevention device and the method thereof using the hash function of the present disclosure provides an efficient means for verifying whether an image of a privacy area (i.e., a personal identifiable information area, hereinafter referred to as a "privacy area") is authentic or not by inserting verification hash value information in a metadata form or a watermarking form into an obfuscated area of an original image.

The effects of the present disclosure are not limited to the above-mentioned effects, and other effects not described above will be clearly understood by those skilled in the art from the following description.

DETAILED DESCRIPTION OF EXEMPLARY EMBODIMENTS

Figure 1:
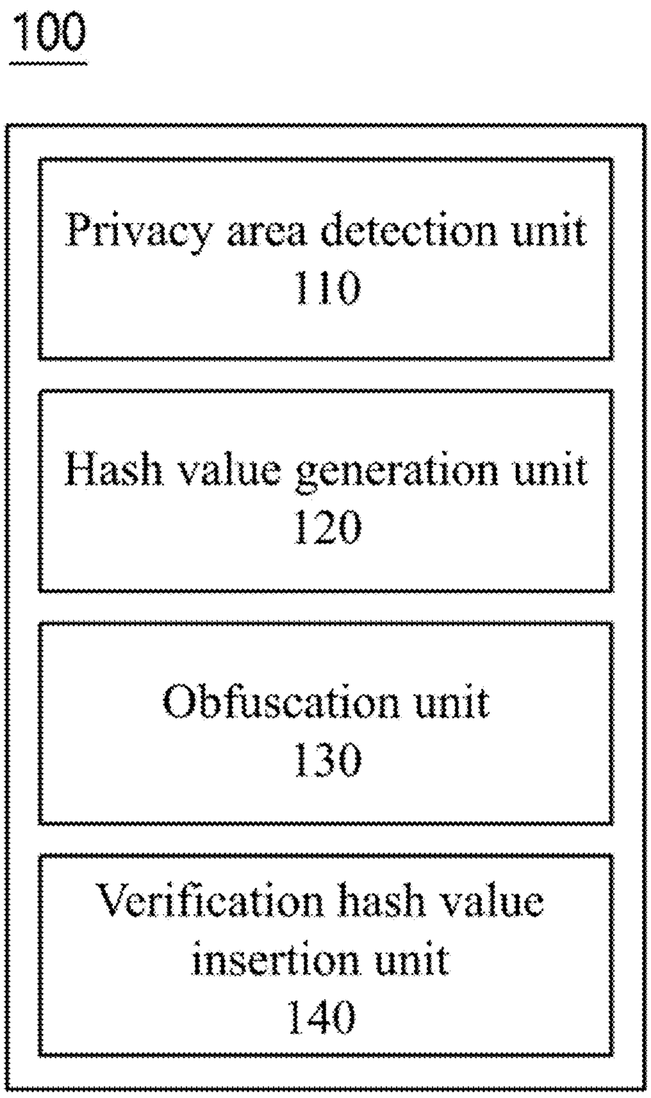
FIG. 1 is a view schematically illustrating a configuration of an image forgery prevention device using a hash function according to an exemplary embodiment of the present disclosure.

Advantages and features of the present disclosure and the method of achieving the same will become apparent with reference to exemplary embodiments described below in detail in conjunction with the accompanying drawings. However, the present disclosure is not limited to the exemplary embodiments disclosed below, but will be implemented in a variety of different forms. These exemplary embodiments are provided only to complete the present disclosure and to completely inform the scope of the present disclosure to those skilled in the art to which the present disclosure pertains, and the present disclosure is only defined by the scope of the claims. Like reference numerals generally denote like components throughout the present disclosure.

The exemplary embodiments described in the present specification will be described with reference to cross-sectional views and/or plan views, which are ideal exemplary views of the present disclosure. In the drawings, the thickness of each component is exaggerated for effective description of the technical content. Accordingly, the components illustrated in the drawings have schematic properties in nature, and the shapes of the components illustrated in the drawings are for illustrating specific forms thereof and are not intended to limit the scope of the present disclosure. Although terms such as first, second, third, etc. have been used in various exemplary embodiments of the present specification in order to describe various components, these components should not be limited by such terms. These terms are merely used to distinguish any one component from another component. The exemplary embodiments described and illustrated herein also include complementary exemplary embodiments thereof.

The terminology used herein is for the purpose of describing particular exemplary embodiments only and is not intended to limit the present disclosure. In the present specification, the singular form also includes the plural form unless otherwise specified in the phrase. The terms "comprises" and/or "comprising" used in the present specification do not exclude the presence or addition of one or more other components, steps, actions and/or elements to the mentioned components, steps, actions and/or elements.

Unless otherwise defined, all terms (including technical and scientific terms) used in the present specification may be used with meanings that may be commonly understood by those skilled in the art to which the present disclosure belongs. In addition, terms defined in the commonly used dictionary are not ideally or excessively interpreted unless explicitly and specifically defined otherwise.

Hereinafter, with reference to the drawings, the concept of the present disclosure and the exemplary embodiments according to the same will be described in detail.

FIG. 1 is a view schematically illustrating a configuration of an image forgery prevention device using a hash function according to an exemplary embodiment of the present disclosure.

The image forgery prevention device 100 using the hash function according to the exemplary embodiment of the present disclosure includes a privacy area detection unit 110, a hash value generation unit 120, an obfuscation unit 130, and a verification hash value insertion unit 140.

The privacy area detection unit 110 detects a privacy area image from an original image. The privacy area detection unit 110 may include at least one processor. Additionally, the privacy area detection unit 110 may also be referred to as a privacy area detection processor.

The original image in the present disclosure means an image itself captured by a camera or the like, and means an image in a state in which any type of image conversion processing, such as mosaic or blind processing, has not been performed. The original image has a state in which individual objects included within the image may be clearly recognized.

The original image may include a moving image and/or a still image, and there are no restrictions on the format of images.

Figure 3:
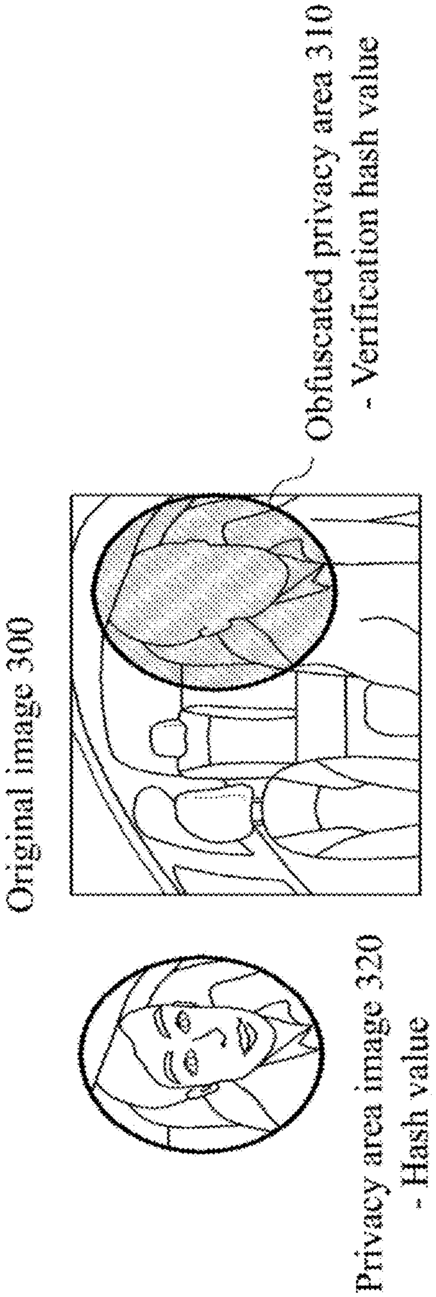
FIG. 3 is a view illustrating an example of an obfuscated privacy area and a privacy area image of an original image of the image forgery prevention device using the hash function according to the exemplary embodiment of the present disclosure.

The term "privacy area image" used in the present disclosure refers to an image of an area including personal privacy information included in an original image. Referring to FIG. 3, in the original image 300, an image 320 of an area including a driver's face is a privacy area image. The privacy area image refers to the image of the area that includes personal information included in the original image. The privacy area image includes any kind of image that displays or implies personal information such as a face, an address, a vehicle license plate number, a password, and a bank account number of a person.

In the exemplary embodiments of the present disclosure, detecting a privacy area image is performed by using artificial intelligence object detection technology. Object detection in still images or moving images is one of the fundamental and widely used techniques in the field of image processing and computer vision.

In an object detection algorithm, a main object is detected and distinguished by displaying a bounding box centered around the corresponding object.

As an example, an object detection algorithm usable in the present disclosure may utilize an object recognition algorithm or the You Only Look Once (YOLO) series algorithm, which is based on deep learning applied with a convolutional neural network (CNN).

The hash value generation unit 120 generates a hash value of a privacy area image by using a hash function. The hash value generation unit 120 may include at least one processor. Additionally, the hash value generation unit 120 may also be referred to as a hash value generation processor.

The hash function is a function configured to map data of arbitrary length to data (i.e., a hash value) of fixed length. The hash value is a value obtained by the hash function. For example, in a case where a user's password is "1234abcd", the hash value may be "$#k!#fkv3" obtained by the hash function.

In the exemplary embodiment, it may be configured such that a different number of bits is used for each hash value generated by the hash value generation unit 120 on the basis of an object detection result of a privacy area image. As an example, the hash value generation unit 120 may be configured to output a hash value having a larger number of bits in a case where a privacy area image includes a person's face as a result of object detection than the number of bits of a hash value in a case where a privacy area image is an object (e.g., a vehicle license plate) as a result of object detection.

In one example, it may be configured such that a privacy area image including a person's face outputs a hash value in SHA512 format, and a privacy area image including a vehicle license plate outputs a hash value in SHA256 format.

SHA, which is a type of hash function, was developed by the U.S. NIST in 1993 and is the most widely used method. SHA1 is designed for use in DSA and is the default hash algorithm in many Internet applications. SHA256, SHA384, and SHA512 are hash algorithms for increasing output lengths so as to correspond to AES key lengths of 128, 192, and 256 bits.

The obfuscation unit 130 obfuscates a privacy area image. The obfuscation unit 130 may include at least one processor. Additionally, the obfuscation unit 130 may also be referred to as an obfuscation processor.

As used in the present disclosure, the term "obfuscation" means any type of image production and processing that renders a privacy area image unrecognizable. As a concept corresponding to code obfuscation that is a process of making code written in a programming language difficult to read, image obfuscation includes mosaic processing, blind processing, blurring, or the like, which is a process of rendering all or part of an image unrecognizable.

The verification hash value insertion unit 140 inserts a verification hash value corresponding to a hash value into an obfuscated privacy area of an original image in a predetermined encrypted form. The verification hash value insertion unit 140 may include at least one processor. Additionally, the verification hash value insertion unit 140 may also be referred to as a verification hash value insertion processor.

In the present disclosure, a verification hash value may be the same as a hash value obtained from a privacy area image by using a hash function, or may be a hash value obtained by performing an additional encryption operation on a hash value obtained from a privacy area image. In one example, the verification hash value may be a hash value having a predetermined correlation with the hash value obtained from the privacy area image.

The term "obfuscated privacy area" used in the present disclosure means an area including privacy information in an original image and means an area in a state of being obfuscated so that no one may recognize the corresponding area.

In the exemplary embodiment, an obfuscated privacy area corresponds to an area of a bounding box of a privacy area image.

A predetermined encrypted form of a verification hash value inserted in the verification hash value insertion unit 140 includes an encrypted-metadata form, an additional data form, or a watermarking form.

Figure 2:
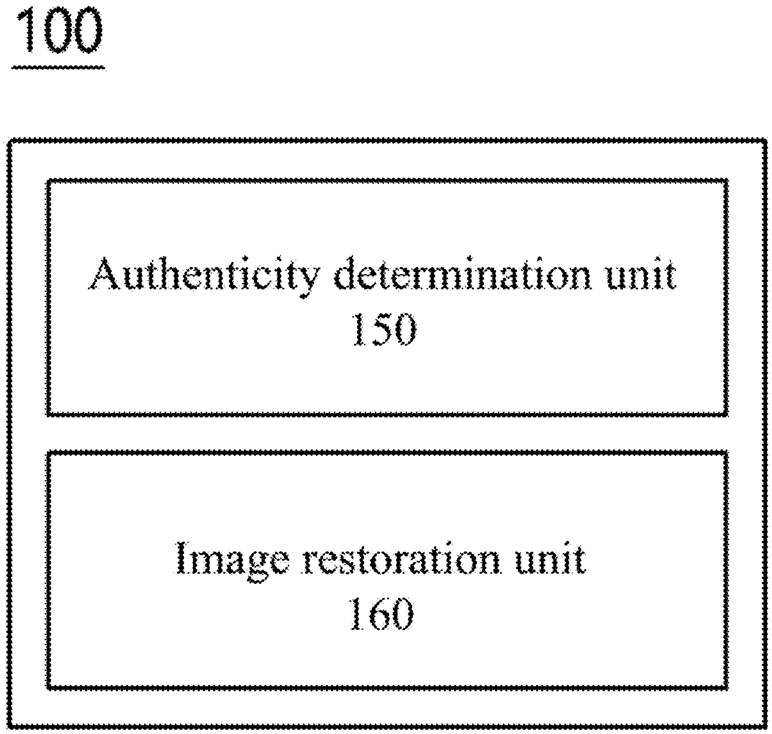
FIG. 2 is a view illustrating an authenticity determination unit and an image restoration unit for a privacy area image in the image forgery prevention device using the hash function according to the exemplary embodiment of the present disclosure.

FIG. 2 is a view illustrating an authenticity determination unit and an image restoration unit for a privacy area image in the image forgery prevention device using the hash function according to the exemplary embodiment of the present disclosure.

The image forgery prevention device 100 using the hash function according to the exemplary embodiment of the present disclosure further includes an authenticity determination unit 150 and an image restoration unit 160.

The authenticity determination unit 150 determines authenticity of the privacy area image by comparing a hash value of a privacy area image with a verification hash value inserted into an obfuscated privacy area of an original image.

The authenticity determination unit 150 may include at least one processor. Additionally, the authenticity determination unit 150 may also be referred to as an authenticity determination processor.

In a case where the hash value and the verification hash value are identical or a predetermined correlation therebetween is recognized, the privacy area image may be determined to be authentic, and in a case where the hash value and the verification hash value are not identical or have no correlation therebetween, the privacy area image may be determined to have been fabricated. The image restoration unit 160 restores the privacy area image to the obfuscated privacy area in a case where the authenticity determination unit 150 determines that the privacy area image is authentic.

The image restoration unit 160 may include at least one processor. Additionally, the image restoration unit 160 may also be referred to as an image restoration processor.

FIG. 3 is a view illustrating an example of an obfuscated privacy area 310 and a privacy area image 320 of an original image 300 of the image forgery prevention device using the hash function according to the exemplary embodiment of the present disclosure.

Referring to FIG. 3, the original image 300 is an image of a driver inside a vehicle, the image being captured by the vehicle's black box (i.e., the vehicle's dash cam).

In one example, the privacy area image 320 including personal privacy information may be stored in a separate storage medium.

In addition, in the original image 300, the privacy area 310 including the privacy information is obfuscated. For example, the privacy area 310 including the driver's face may be blinded. The driver's face is unable to be identified with only the original image 300 after blind processing is performed. The original image 300 including the obfuscated privacy area may be saved and stored in a storage medium separate from a medium in which the privacy area image 320 is stored.

Figure 4:
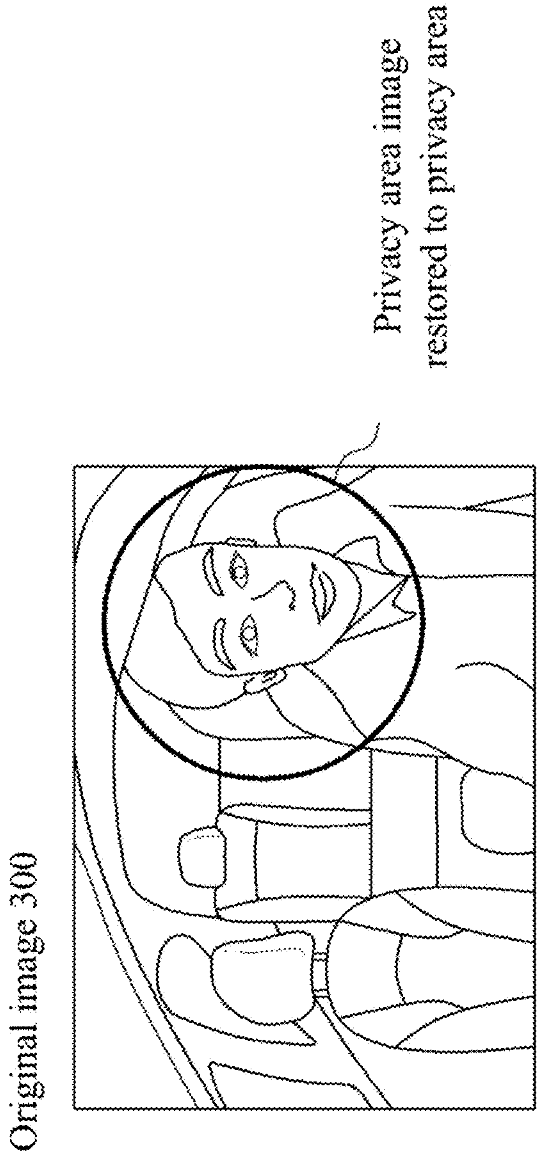
FIG. 4 is a view illustrating an example of an image painted black (i.e., redacted) in a restored state from the original image having the obfuscated privacy area of FIG. 3.

FIG. 4 is a view illustrating an example of an image painted black (i.e., redacted) in a restored state from the original image having the obfuscated privacy area of FIG. 3.

The authenticity determination unit 150 determines authenticity of privacy area image by comparing a hash value of the privacy area image 320 with a verification hash value inserted into the obfuscated privacy area 310 of the original image. In a case where the hash value and the verification hash value are identical or a predetermined correlation therebetween is recognized, it is considered authentic.

In a case where the privacy area image 320 is determined to be authentic, the privacy area image is restored to the obfuscated privacy area.

The image forgery prevention device using the hash function of the present disclosure may verify whether the privacy area image is authentic or not by using the hash function, thereby ensuring the uniqueness and integrity of the image.

Figure 5:
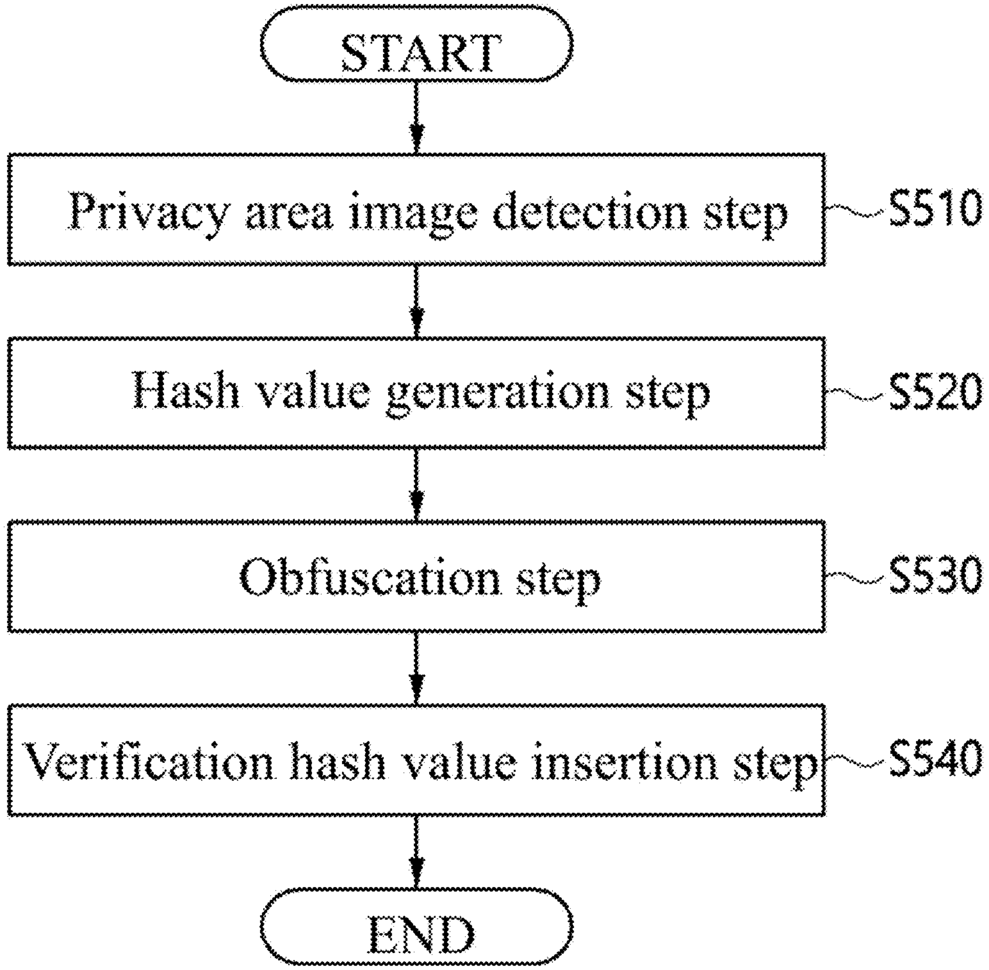
FIG. 5 is a flowchart illustrating an image forgery prevention method using a hash function according to an exemplary embodiment of the present disclosure.

FIG. 5 is a flowchart illustrating an image forgery prevention method using a hash function according to an exemplary embodiment of the present disclosure.

The image forgery prevention method using the hash function according to another exemplary embodiment of the present disclosure includes a privacy area image detection step S510, a hash value generation step S520, an obfuscation step S530, and a verification hash value insertion step S540.

A hash function or hash algorithm is a function configured to map data of arbitrary length to data of fixed length. A value obtained by the hash function is called a hash value, hash code, a hash checksum, or hash, and one of usage therefor is a data structure called a hash table, which is widely used in computer software for very fast data retrieval. Because of its ability to find duplicate records in a large file, the hash function is able to accelerate database searches or table lookups.

For example, the hash function may also be used to find similar patterns in DNA sequences. In addition, the hash function may also be used in cryptography. A cryptographic hash function is usable due to the fact that determining an original input value by only knowing a mapped hash value is difficult.

In addition, the hash function is also used to verify the integrity of transmitted data, and is used as a block constituting an HMAC, which verifies who a message came from. The hash function should operate in a deterministic manner, so when two hash values are different, each original data for the hash values should also be different (the reverse is not true).

In the present disclosure, for an original image, a cryptographic hash function is used to obtain a hash value for a blind-processed area image and a verification hash value is inserted into an obfuscated privacy area in a metadata form, an additional data form, or a watermarking form, so that both are stored separately.

In addition, when necessary, it is required to restore the hashed image into the original image including the privacy information, and the uniqueness and integrity of data are ensured by using the verification hash value inserted into the original image.

A privacy area image detection step S510 detects a privacy area image from an original image by a privacy area detection unit 110.

A hash value generation step S520 generates a hash value of the privacy area image by using a hash function by a hash value generation unit 120.

An obfuscation step S530 obfuscates the privacy area image by an obfuscation unit 130.

A verification hash value insertion step S540 inserts a verification hash value corresponding to the hash value into an obfuscated privacy area of the original image in a predetermined encrypted form by a verification hash value insertion unit 140.

The image forgery prevention method using the hash function according to another exemplary embodiment of the present disclosure further includes an authenticity determination step of determining, by an authenticity determination unit 150, whether the privacy area image is authentic or not by comparing the hash value of the privacy area image with the verification hash value inserted into the obfuscated privacy area of the original image.

The image forgery prevention method using the hash function according to another exemplary embodiment of the present disclosure restores, by an image restoration unit 160, the privacy area image to the obfuscated privacy area in a case where the hash value and the verification hash value are identical.

In the exemplary embodiment, the detecting of the privacy area image is performed by using artificial intelligence object detection technology, and the obfuscated privacy area corresponds to an area of a bounding box of the privacy area image.

In the exemplary embodiment, a predetermined encrypted form of the verification hash value inserted by the verification hash value insertion unit 140 is an encrypted-metadata form or a watermarking form.

Figure 6:
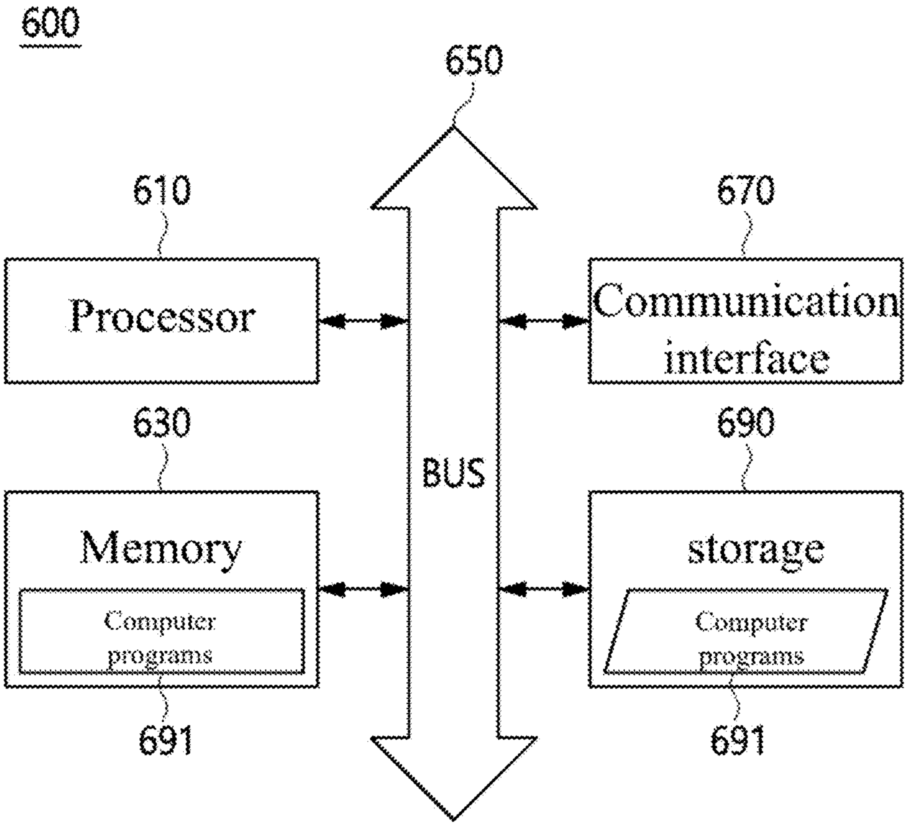
FIG. 6 is a view illustrating an exemplary computing device capable of implementing devices and/or systems according to various exemplary embodiments of the present disclosure.

FIG. 6 is a view illustrating an exemplary computing device capable of implementing devices and/or systems according to various exemplary embodiments of the present disclosure.

The exemplary computing device 600 that may be used to implement devices according to some exemplary embodiments of the present disclosure is described in more detail with reference to FIG. 6.

The computing device 600 may include one or more processors 610, a bus 650, a communication interface 670, a memory 630 configured to load computer programs 691 executed by the processors 610, and a storage 690 configured to store the computer programs 691. However, only components related to the exemplary embodiments of the present disclosure are illustrated in FIG. 6.

Accordingly, those skilled in the art to which the present disclosure belongs will appreciate that, in addition to the components illustrated in FIG. 6, other common components may be further included.

The processors 610 control the overall operation of each component of the computing device 600. Each processor 610 may be configured to include a Central Processing Unit (CPU), a Micro Processor Unit (MPU), a Micro Controller Unit (MCU), a Graphics Processing Unit (GPU), or any type of processor 610 well known in the technical field of the present disclosure. In addition, the processors 610 may perform operations for at least one or more applications or programs configured to execute the method according to the exemplary embodiments of the present disclosure. The computing device 600 may have one or more processors 610. The computing device 600 may refer to artificial intelligence (AI).

The memory 630 stores various types of data, commands, and/or information. The memory 630 may load one or more programs 691 from the storage 690 in order to execute the method according to the exemplary embodiments of the present disclosure. The memory 630 may be implemented as a volatile memory such as RAM, but the technical scope of the present disclosure is not limited thereto.

The bus 650 provides a function of communication between the components of the computing device 600. The bus 650 may be implemented as various types of buses such as an address bus, a data bus, and a control bus.

The communication interface 670 supports wired and wireless Internet communication of the computing device 600. In addition, the communication interface 670 may also support various communication methods other than Internet communication. To this end, the communication interface 670 may be configured to include a communication module well known in the technical field of the present disclosure.

According to some exemplary embodiments, the communication interface 670 may also be omitted.

The storage 690 may non-temporarily store one or more programs 691 and various types of data.

The storage 690 may be configured to include nonvolatile memory such as a Read Only Memory (ROM), an Erasable Programmable ROM (EPROM), an Electrically Erasable Programmable ROM (EEPROM), a flash memory, a hard disk, a removable disk, or any type of computer-readable recording medium well known in the technical field to which the present disclosure belongs.

When loaded into the memory 630, each computer program 691 may include one or more commands that cause the processors 610 to perform the method/operations according to various exemplary embodiments of the present disclosure. That is, the processors 610 may perform the method/operations according to various exemplary embodiments of the present disclosure by executing one or more commands.

In the above, the preferred exemplary embodiments of the present disclosure have been illustrated and described, but the present disclosure is not limited to the specific exemplary embodiments described above. In the present disclosure, various modifications may be possible by those skilled in the art to which the present disclosure belongs without departing from the spirit of the present disclosure claimed in the claims, and these modifications should not be understood individually from the technical ideas or prospect of the present disclosure.

What is claimed is:

1. An image forgery prevention device using a hash function, the device comprising:

a privacy area detection processor configured to detect a privacy area image from an original image;

a hash value generation processor configured to use the hash function to generate a hash value of the privacy area image, wherein the hash value is generated only for the detected privacy area image, and the hash value is generated with the image forgery prevention purpose of the detected privacy area, the hash value is generated to have a larger number of bits in a case where the detected privacy area image comprises a person's face as a result of the detection of the privacy area detection processor than the number of bits of the hash value in a case where the detected privacy area image is an object comprising an address, a vehicle license plate number, a password and a bank account number as a result of the detection of the privacy area detection processor;

an obfuscation processor configured to obfuscate the privacy area image;

a verification hash value insertion processor configured to insert a verification hash value corresponding to the hash value into an obfuscated privacy area of the original image in a predetermined encrypted form, wherein the verification hash value is inserted only for the obfuscated privacy area of the original image, the verification hash value is inserted with the image forgery prevention purpose of the detected privacy area, the verification hash value comprises a predetermined correlation only with the hash value;

an authenticity determination processor configured to determine whether the privacy area image is authentic or not by comparing the hash value of the privacy area image with the verification hash value inserted only into the obfuscated privacy area of the original image; and an image restoration processor configured to restore the privacy area image to the obfuscated privacy area in a case where the hash value and the verification hash value satisfy the predetermined correlation.

2. The device of claim 1, wherein the detecting of the privacy area image is performed by using artificial intelligence object detection technology, and the obfuscated privacy area corresponds to an area of a bounding box of the privacy area image.

3. The device of claim 1, wherein the predetermined encrypted form of the verification hash value inserted in the verification hash value insertion processor is an encrypted-metadata form or a watermarking form.

4. An image forgery prevention method using a hash function, the method comprising:

a privacy area image detection step of detecting a privacy area image from an original image by a privacy area detection processor;

a hash value generation step of using the hash function to generate a hash value of the privacy area image by a hash value generation processor, wherein the hash value is generated only for the detected privacy area image, and the hash value is generated with the image forgery prevention purpose of the detected privacy area, the hash value is generated to have a larger number of bits in a case where the detected privacy area image comprises a person's face as a result of the detection of the privacy area detection processor than the number of bits of the hash value in a case where the detected privacy area image is an object comprising an address, a vehicle license plate number, a password and a bank account number as a result of the detection of the privacy area detection processor;

an obfuscation step of obfuscating the privacy area image by an obfuscation processor;

a verification hash value insertion step of inserting a verification hash value corresponding to the hash value into an obfuscated privacy area of the original image in a predetermined encrypted form by a verification hash value insertion processor, wherein the verification hash value is inserted only for the obfuscated privacy area of the original image, the verification hash value is inserted with the image forgery prevention purpose of the detected privacy area, the verification hash value comprises a predetermined correlation only with the hash value;

an authenticity determination step of determining, by an authenticity determination processor, whether the privacy area image is authentic or not by comparing the hash value of the privacy area image with the verification hash value inserted into the obfuscated privacy area of the original image; and an image restoration step of restoring, by an image restoration processor, the privacy area image to the obfuscated privacy area in a case where the hash value and the verification hash value satisfy the predetermined correlation.

5. The method of claim 4, wherein the detecting of the privacy area image is performed by using artificial intelligence object detection technology, and the obfuscated privacy area corresponds to an area of a bounding box of the privacy area image.

6. The method of claim 4, wherein the predetermined encrypted form of the verification hash value inserted in the verification hash value insertion processor is an encrypted-metadata form or a watermarking form.

* * * * *